United States Patent

Lucas et al.

[11] Patent Number: 5,918,630
[45] Date of Patent: Jul. 6, 1999

[54] PIN-WITHIN-A-SLEEVE THREE-WAY SOLENOID VALVE WITH SIDE LOAD REDUCTION

[75] Inventors: Michael A. Lucas, Columbus, Ind.; Chafic M. Hammoud, Downey, Calif.

[73] Assignee: Cummins Engine Company, Inc., Columbus, Ind.

[21] Appl. No.: 09/010,545

[22] Filed: Jan. 22, 1998

[51] Int. Cl.$^6$ .................................................. F15B 13/044
[52] U.S. Cl. .............................. 137/596.17; 137/625.65
[58] Field of Search ........................... 137/596.17, 625.65

[56] References Cited

U.S. PATENT DOCUMENTS

| | | | |
|---|---|---|---|
| Re. 34,261 | 5/1993 | Sule | 137/625.65 X |
| 1,792,836 | 2/1931 | Handwerker . | |
| 2,912,168 | 11/1959 | L'Orange . | |
| 3,409,225 | 11/1968 | Maddalozzo et al. . | |
| 3,680,782 | 8/1972 | Monpetit et al. . | |
| 4,431,160 | 2/1984 | Burt et al. . | |
| 4,571,161 | 2/1986 | Leblanc et al. . | |
| 4,669,659 | 6/1987 | Leblanc et al. . | |
| 5,002,022 | 3/1991 | Perr . | |
| 5,011,079 | 4/1991 | Perr . | |
| 5,038,826 | 8/1991 | Kabai et al. . | |
| 5,236,173 | 8/1993 | Wakeman . | |
| 5,269,268 | 12/1993 | Hara . | |
| 5,396,926 | 3/1995 | Pataki et al. . | |

OTHER PUBLICATIONS

*Compact High Performance Fuel System with Accumulator,* Cavanagh et al., PCT Patent Publication No. WO 94/27041, Nov. 24, 1994, Drawing Sheets 1, 18, 21, 22, and 43, pp. 1, 26–34, 63–71, and 111–112.

*Primary Examiner*—Gerald A. Michalsky
*Attorney, Agent, or Firm*—Sixbey, Friedman, Leedom & Ferguson; Charles L. Leedom, Jr.; Tim L. Brackett, Jr.

[57] ABSTRACT

A solenoid operated pin-within-a-sleeve three-way valve for high pressure fuel systems is provided which is capable of effectively minimizing the side loads imparted to the movable pin and sleeve elements while effectively controlling the timing and quantity of fuel injection. The three-way valve assembly includes a floating pin telescopingly received within the cavity of the movable valve member. A side load reducing device is provided for minimizing side loading on the floating pin and the movable valve member which includes a tappet reciprocally mounted in the valve housing adjacent one end of the floating pin, a biasing spring for causing the tappet to follow the pin and for causing the pin to follow the movable valve member to keep the second valve seat closed as the movable valve member is advanced toward the first position from the second position. The side load reducing feature also includes a planar surface formed on the tappet, and a semi-spherical surface formed on the floating pin for abutment against the planar surface. The side load reducing device ensures that transverse or side loads on the floating pin are minimized by transferring biasing spring-induced side loads to a tappet housing via the tappet while minimizing the contact surface between floating pin and tappet via the point-of-contact abutment of the semi-spherical and planar surfaces.

6 Claims, 2 Drawing Sheets

PIN-WITHIN-A-SLEEVE THREE-WAY SOLENOID VALVE WITH SIDE LOAD REDUCTION

TECHNICAL FIELD

The present invention relates to a solenoid operated pin-within-a-sleeve three-way valve for high pressure fuel systems which is capable of effectively minimizing the side loads imparted to the movable pin and sleeve elements while effectively controlling the timing and quantity of fuel injection.

BACKGROUND OF THE INVENTION

Three-way solenoid valves have long been used for controlling fluid flow in a variety of air and hydraulic systems, particularly fuel systems. Such three-way solenoid valves often control the passage of fluid under high pressure from a source to a load device and selectively interrupt the flow of pressurized while simultaneously connecting the load device to a substantially unpressurized drain. Typically, a three-way valve includes a valve housing having first, second and third valve passages interconnected by an internal valve chamber containing two valve seats and a valve element movable to control fluid flow among the three valve passages by moving between (1) a first position in which the movable valve member engages a first one of the valve seats to isolate a first one of the valve passages from the internal chamber while allowing fluid communication between the second and third valve passages through the second valve seat and internal chamber, and (2) a second position in which the movable valve member engages the second valve seat to isolate a second one of the valve passages while allowing fluid communication between the first and third valve passages through the first valve seat and internal chamber.

Recent and upcoming legislation resulting from a concern to improve fuel economy and reduce emissions continues to place strict emissions standards on engine manufacturers. In order for new engines to meet these standards, it is necessary to produce fuel injection systems capable of achieving higher injection pressures while maintaining accurate and reliable control of the metering and timing functions. Three-way valves have been particularly useful in achieving new levels of operation by effectively controlling the flow of fuel in high pressure fuel systems, such as disclosed in PCT patent publication WO 94/27041, entitled Compact High Performance Fuel System With Accumulator. A "pin-within-a-sleeve" type three-way solenoid operated valve, such as disclosed in U.S. Pat. No. 5,396,926 issued to Pataki et al., is especially effective in handling very high fuel pressures while providing extremely fast response time. This pin-within-a-sleeve type three-way valve includes a hollow movable valve member having a floating inner pin telescopingly received within the hollow movable valve member. In an advanced position, the hollow movable valve member is biased into engagement with a first valve seat formed in the surrounding valve housing and engaged by the movable valve member. In a solenoid retracted position, the movable valve member is biased against the floating inner pin to open the first valve seat and close a second valve seat located within the hollow movable valve member and positioned to be engaged by one end of the floating inner pin. This particular pin-within-a-sleeve design has been found to be especially advantageous in controlling high pressure fuel flow due to its pressure balanced design. Moreover, the components of this particular valve are packaged to form a more compact assembly.

Although the pin-within-a-sleeve three-way valve disclosed in Pataki et al. functions to effectively control the timing and quantity of fuel injection, valve designers continually strive to minimize the size, weight and cost of valve assemblies, including the Pataki et al. valve. Reductions in valve length also achieves certain manufacturing benefits resulting in lower costs. However, it has been discovered that reductions in the guided length of the hollow valve member and the floating inner pin result in drastically increased incidences of valve failure due to binding between the movable valve member and the valve housing, and between the floating pin and the movable valve member.

Consequently, there exists a need for a compact pin-within-a-sleeve solenoid operated three-way valve capable of effectively handling very high fuel pressures with extremely fast response time while avoiding binding of the movable valve components.

SUMMARY OF THE INVENTION

It is an object of the present invention, therefore, to overcome the disadvantages of the prior art and to provide a pin-within-a-sleeve three-way valve with minimal side loading on the movable valve components.

Another object of the present invention is to provide a compact pin-within-a-sleeve three-way valve having a reduced axial length which avoids binding of the movable valve components.

Yet another object of the present invention is to provide a compact pin-within-a-sleeve three-way valve including a floating pin telescopingly mounted in, and biased toward, a movable valve element wherein side loads on the floating pin caused by the biasing device are minimized.

Still another object of the present invention is to provide a compact, inexpensive pin-within-a-sleeve three-way valve designed to reduce manufacturing costs while achieving accurate reliable control of fuel flow at extremely high fuel pressures.

These and other objects of the present invention are achieved by providing a three-way valve assembly comprising a valve housing containing a valve chamber and first, second and third valve passages communicating with the valve chamber, a movable valve member mounted for reciprocal movement within the valve chamber between a first position in which the third passage is isolated from the first and second valve passages and the first and second valve passages are in fluid communication, and a second position in which the second valve passage is isolated from the first and third valve passages and the first and third passages are in fluid communication. The movable valve member contains a cavity opening into one end of the movable valve member. Also, the three-way valve assembly includes a floating pin telescopingly received within the cavity of the movable valve member and a first valve seat located within the chamber and positioned to be closed when the movable valve member is in the first position to isolate the third valve passage from the first and the second valve passages and allow fluid communication between the first and the second valve passages. A second valve seat is located within the cavity of the movable valve member and positioned to be closed by the floating pin when the movable valve member is in the second position to seal the second passage from the first and third valve passages and allow fluid communication between the first and third valve passages. Importantly, the three-way valve assembly of the present invention also includes a side load reducing feature for minimizing side loading on the floating pin and the movable valve member. The side load reducing feature includes a tappet reciprocally mounted in the valve housing adjacent one end of the floating pin, a biasing spring for causing the tappet to follow the pin and for causing the pin to follow the movable valve member to keep the second valve seat closed as the movable valve member is advanced toward the first position from the second position. The side load reducing feature also includes a planar surface formed on one of the floating pin and the tappet, and a semispherical surface formed on the other of the floating pin and tappet for abutment against the planar surface.

Preferably, the planar surface is formed on the tappet and the semispherical surface is formed on the floating pin. The side load reducing feature of the present invention has been especially effective in three-way valves wherein the ratio of the floating pin guided length to the floating pin diameter is less than 4.5. The biasing spring may be positioned in a recess formed in the tappet. Also, the valve housing includes a main portion containing the valve chamber, a tappet housing portion mounted at one end of the main portion and a pin stop plate positioned in compressive abutment between the main portion and the tappet housing. The pin stop plate is positioned for abutment by the floating pin when the movable valve member is in the first position. The valve housing may further include a cover plate mounted on one side of the tappet housing portion opposite the pin stop plate for abutment by the tappet.

DETAILED DESCRIPTION OF THE INVENTION

Figure 1:
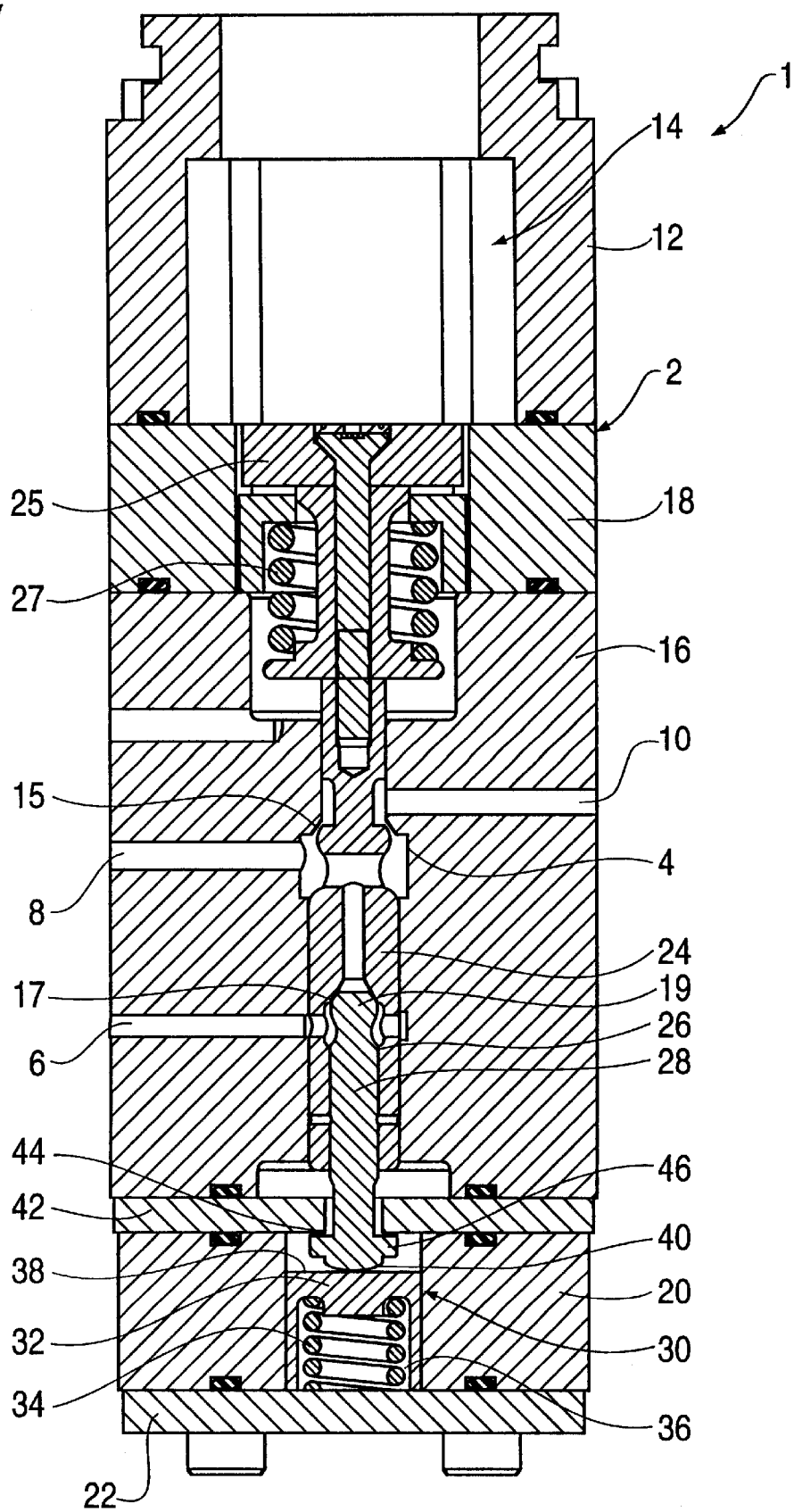
FIG. 1 is a cross sectional view of a force balanced pin-within-a-sleeve three-way valve in accordance with a preferred embodiment of the present invention in the closed and de-energized state.
Figure 2:
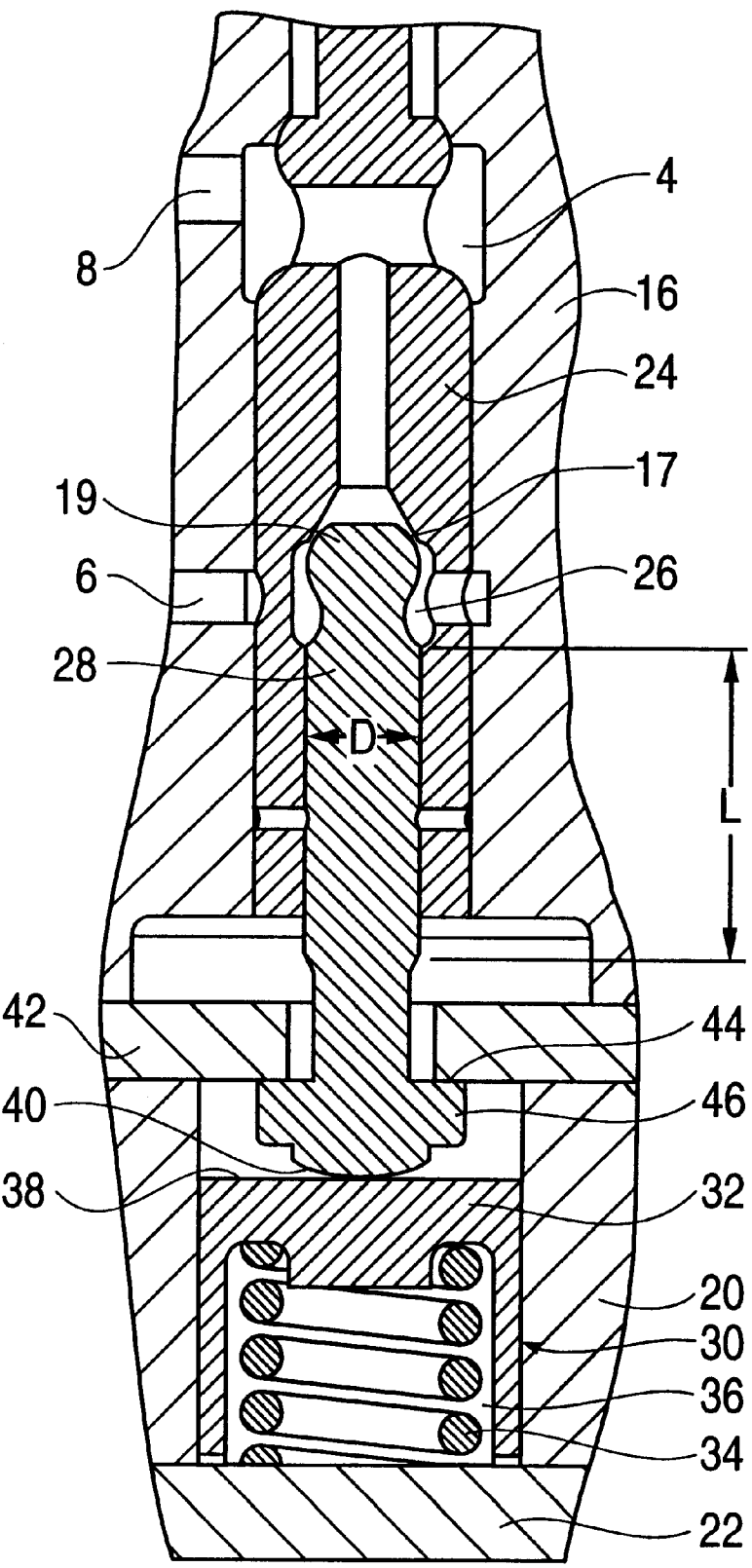
FIG. 2 is a cross sectional view of a portion of the pin-within-a-sleeve three-way valve of FIG. 1 in the open and energized state just before the floating pin is returned to its retracted position.

Referring to FIGS. 1 and 2, the force balanced or pressure balanced three-way valve assembly of the present invention is illustrated. A complete detailed description of the fundamental structural features of this valve with the exception of the side load reducing feature of the present invention, and the operation and many advantages of this valve design, are completely discussed in U.S. Pat. No. 5,396,926, the entire contents of which is hereby incorporated by reference. This valve design is particularly suited for application as an injection control valve used in a compression ignition internal combustion engine wherein desirable fuel injection pressures in excess of 20,000 psi may be required. The pressure balanced three-way solenoid valve 1 includes a valve housing 2 which includes a valve chamber 4 in the form of a central bore extending the entire length of the housing as well as fluid communication valve passages 6, 8 and 10, fluidically communicating with the valve chamber 4. Valve passage 6 is a high pressure fluid supply passage and may be connected with a source of high pressure fuel for an internal combustion engine. For example, valve passage 6 may be connected to an accumulator (not illustrated) which is adapted to temporarily retain fuel at very high pressure, for example, in excess of 5,000–30,000 psi. Such pressures are highly desirable in order to achieve high engine efficiency and low emissions. Controlling fluids under such high pressure is difficult in any circumstances but is particularly difficult in the case of fuel injection systems since the timing and quantity of fuel must be very precisely controlled in synchronism with engine operation. Valve passage 8 may be connected to supply pressurized fluid to a load device such as a hydraulic cylinder, fuel injection nozzle or the like. Valve passage 10 is a drain passage for returning fluid to a fluid supply (not shown). The present invention provides a three-way valve which is ideally suited to control the supply of fuel to the individual cylinders of an internal combustion engine but may be used in any environment for any purpose requiring fluid control under conditions of high pressure, high speed and precise control.

Valve housing 2 includes an actuator housing 12 containing an electromagnetic solenoid actuator 14, a main housing portion 16 in which valve chamber 4 is formed and a spacer portion 18 positioned in compressive abutment between actuator housing 12 and main portion 16. Valve housing 2 further includes a tappet housing portion 20 mounted at an opposite end of main portion 16 from spacer portion 18 for housing the side load reducing device of the present invention as discussed more fully hereinbelow. A cover plate 22 is mounted on an opposite side of tappet housing portion 20 from main portion 16 to close off valve chamber 4 extending through tappet housing portion 20 and which also functions in conjunction with the side load reducing device of the present invention as discussed more fully hereinbelow.

Reciprocally positioned within valve chamber 4 is a movable valve member 24 which is adapted to reciprocate between first and second positions to control fluid communication among valve passages 6, 8 and 10. Movable valve member 24 is sized to form a close sliding fit with the inside surface of valve chamber 4 creating a fluid seal between the adjacent surfaces to prevent fluid from leaking from the valve assembly. The upper end of movable valve member 24 is connected to an armature 25 associated with solenoid actuator 14. A coil spring 27 biases movable valve member 24 toward the second position. Movable valve member 24 contains a cavity 26 formed to open into one end of valve member 24. Received in cavity 26 of movable valve member 24 is a free or floating pin 28 sized to form a close sliding fit with the inside surface of valve member cavity 26 creating a fluid seal which substantially prevents fluid from leaking from the clearance between the pin 28 and movable valve member 24.

Forming a portion of the housing between valve passage 8 and drain valve passage 10 is a valve seat 15 which when in contact with the movable valve member 24 isolates drain passage 10 from the remaining valve passages 6 and 8. Valve passages 6 and 8 are fluidically connected when the movable valve member 24 is positioned in the first position as illustrated in FIG. 1. Additionally, formed in valve member cavity 26 is a valve seat 17 which cooperates with an upper surface 19 of floating pin 28 in order to seal fluidic communication between supply valve passage 6 and outlet valve passage 8.

A side load reducing device 30 is mounted at the outer end of floating pin 28 provides a lower limit for the movement of floating pin 28 within cavity 26 of movable valve member 24, causes floating pin 28 to follow movable valve member 24 toward the first position and minimizes side loading on floating pin 28 throughout operation. Side load reducing device 30 includes a tappet 32 reciprocally mounted in a portion of valve chamber 4 extending through tappet housing portion 20. Tappet 32 is sized to form a close sliding fit with the inner walls of tappet housing portion 20 so as to be guided during its reciprocating movement. Side load reducing device 30 further includes a biasing spring 34 positioned in a recess 36 formed in one end of tappet 32. Biasing spring 34 functions to bias tappet 32 into abutment with the outer end of floating pin 28. One end of biasing spring 34 is seated against the inner surface of cover plate 22 while the opposite end engages tappet 32. Side load reducing device 30 also includes a planar surface 38 formed on one side of tappet 32 facing floating pin 28 and a semi-spherical surface 40 formed on the outer end of floating pin 28 for abutment against planar surface 38. Side load reducing device 30 ensures that transverse or side loads on floating pin 28 are minimized by transferring biasing spring-induced side loads to tappet housing portion 20 via tappet 32 while minimizing the contact surface between floating pin 28 and tappet 32 via the semi-spherical and planar connection. Specifically, biasing spring 34 may impart a greater upward force on one side of tappet 32 than the other side. However, this biasing spring induced side loading of tappet 32 is transferred to tappet housing 20 via the side walls of tappet 32 thereby preventing tappet 32 from applying the transverse forces to floating pin 28. Also, during reciprocating movement of floating pin 28 and tappet 32, relative transverse or side movement between floating pin 28 and tappet 32 may occur due to, for example, misalignment between cavity 26 and the portion of valve chamber 4 within which tappet 32 reciprocates, or externally induced vibrations in housing 2. However, the semi-spherical surface 40 contacts planar surface 38 over a minimal area, i.e. a point of contact, thereby minimizing any frictional resistance to the relative side movement between floating pin 28 and tappet 32 thus reducing the side loads on floating pin 28.

Pin stop plate 42 is positioned in compressive abutment between main portion 16 and tappet housing portion 20 of valve housing 2. Pin stop plate 42 includes a stop surface 44 positioned adjacent to, and facing, a radial flange 46 formed on the outer end portion of floating pin 28. Pin stop plate 42 functions to define the distance over which floating pin 28 is permitted to travel upwardly as shown in FIG. 1 as movable valve member 24 moves toward the first valve seat into the first position. Thus, floating pin 28 is permitted to travel with movable valve member 24 during the initial movement of movable valve member 24 from the second position toward the first position to minimize transition losses to the drain passage 10. That is, very little high pressure fluid is permitted to initially pass to drain before movable valve member 24 is fully seated against the first valve seat.

The operation of the present valve assembly will now be discussed with specific reference to side load reducing device 30. A more detailed description of the operation of the entire valve is included in U.S. Pat. No. 5,396,926, the entire contents of which has been incorporated by reference herein. Referring to FIG. 1, in the de-energized state, the armature is spaced a predetermined distance away from the electromagnetic solenoid actuator 14, the semi-spherical surface 40 of floating pin 28 is positioned against planar surface 38 of tappet 32, tappet 32 is positioned in abutment against cover plate 22 and the upper surface 19 of floating pin 28 is seated against second valve seat 17, thus sealing fluid communication between the high pressure fluid supply passage 6 and the outlet passage 8. Further, the movable valve member 24 is spaced away from first valve seat 15, thus permitting fluidic communication between valve passage 8 and drain passage 10. Further, radial flange 46 is spaced a predetermined distance from pin stop plate 42.

When electromagnetic solenoid actuator 14 is energized, armature 25 is drawn upwardly toward the actuator, consequently advancing movable valve member 24 in an upward direction against coil spring 27. During initial movement of movable valve member 24, floating pin 28 follows movable valve member 24 due to the upward force generated by biasing spring 34 against tappet 32. In doing so, upper surface 19 of floating pin 28 remains seated against second valve seat 17 of movable valve member 24. Consequently, no pressurized supply of fluid is permitted to pass to the drain passage 10. Once partially displaced, the radial flange 46 of floating pin 28 contacts pin stop plate 42, thus stopping any continued upward or advanced movement of floating pin 28 as shown in FIG. 2. As may be readily noted, the axial extent of pin stop plate 42 controls the distance over which floating pin 28 is permitted to travel. Preferably, pin stop plate 42 is designed with a width or axial extent sized to stop the movement of floating pin 28 just prior to the completion of the valve stroke, i.e. the closing of valve seat 15. Importantly, during movement of floating pin 28 prior to contacting pin stop plate 42, side load reducing device 30 effectively causes floating pin 28 to move with movable valve member 24 while minimizing side loads on floating pin 28. As a result, side load reducing device 30 prevents floating pin 28 from binding against movable valve member 24 while minimizing side load induced wear of the mating surfaces of pin 28 and valve member 24 which may occur when undue nonaxial or side forces are applied to floating pin 28.

As shown in FIG. 2, once radial flange 46 contacts pin stop plate 42, continued movement of movable valve member 24 in the upward direction separates upper surface 19 of floating pin 28 from second valve seat 17. Once separated, the supply of pressurized fluid passing through the passage between second valve seat 17 and upper surface 19 will drive floating pin 28 downwardly against the force of biasing spring 34 resulting in a separation of radial flange 46 and pin stop plate 42. Side load reducing device 30 permits smooth, unhindered sliding movement of floating pin 28 relative to movable valve member 24 by minimizing side loading on floating pin 28.

Thus, the three-way valve assembly one of the present invention including side load reducing device 30 results in distinct advantages over conventional pin-within-a-sleeve three-way solenoid valve assemblies. Some conventional pin-within-a-sleeve three-way valve assemblies bias the floating pin toward the movable valve member using a coil spring having one end positioned in abutment with the floating pin, as disclosed in U.S. Pat. No. 5,396,926. However, Applicants have determined that the coil spring applies an uneven force distribution on the outer end of the floating pin resulting in nonaxial, or side, loads on the floating pin. The uneven force distribution imparted by the coil spring necessarily results from the design of the coil spring and the large area over which the coil spring contacts the floating pin. Thus, one side of the floating pin may receive a greater biasing force than the other side causing side loads or a moment arm to be placed on the floating pin. The adverse effects of the side loads on the movable connection between a floating pin and a movable valve member, and thus between the movable valve member and the adjacent housing, are exacerbated when the axial length of the contact between the floating pin and movable valve member is decreased. This pin guided length, indicated at L in FIG. 2, functions, in part, to distribute any side loads over the area of contact between the floating pin and movable valve member. Thus, both the pin guide length L and the diameter D of the floating pin determines the adverse wear and binding effect of side loads. Applicants have determined that when the length to diameter ratio of the floating pin is reduced from approximately 4.6 to approximately 4.0, the likelihood of valve failure due to binding between the floating pin and the movable valve member increases dramatically for the valve design disclosed in U.S. Pat. No. 5,396,926 since the same sides forces are distributed over a smaller area. However, it is desirable to minimize the pin guided length L, and reduce the length to diameter ratio, in order to reduce manufacturing costs associated with forming and finishing the mating surfaces forming valve chamber 4 and cavity 26, while advantageously reducing the packaging size of the valve assembly. Side load reducing device 30 minimizes the side loads placed on floating pin 28 by biasing spring 34 to such a degree to permit a length to diameter ratio of approximately 4.0 to be utilized without experiencing side load induced valve failure, i.e. binding between floating pin 28 and valve member 24 and/or between valve member 24 and main portion 16 of housing 2 and possibly breaking of floating pin 28. Side load reducing device 30 accomplishes these advantages by utilization of tappet 32 for transferring side loads to valve housing 2, and by using planar surface 38 and semi-spherical 40 which create a point-of-contact abutment for minimizing frictional side loads while applying the biasing force of spring 34 in an axial direction along the center longitudinal axis of floating pin 28.

INDUSTRIAL APPLICABILITY

The pressure balanced three-way solenoid valve of the present invention may be readily adapted to control the flow of air, hydraulic fluid or fuel in a variety of known pneumatic, hydraulic and fuel systems. The pressure balanced three-way solenoid valve, including a side load reducing device of the present invention, is especially effective in controlling the flow of fuel to one or more injectors in a high pressure fuel system of an internal combustion engine where handling very high fuel pressures with extremely fast valve response is required.

We claim:
1. A three-way valve assembly, comprising:
   a valve housing containing a valve chamber and first, second and third valve passages communicating with said valve chamber;
   a movable valve member mounted for reciprocal movement within said valve chamber between a first position in which said third passage is isolated from said first and second valve passages and said first and second valve passages are in fluid communication, and a second position in which said second valve passage is isolated from said first and third valve passages and said first and third passages are in fluid communication, said movable valve member containing a cavity opening into one end of said movable valve member;
   a floating pin telescopingly received within said cavity of said movable valve member;
   a first valve seat located within said chamber and positioned to be closed when said movable valve member is in said first position to isolate said third valve passage from said first and said second valve passages and allow fluid communication between said first and said second valve passages;
   a second valve seat located within said cavity of said movable valve member, said second valve seat being positioned to be closed by said floating pin when said movable valve member is in said second position to seal said second passage from said first and third valve passages and allow fluid communication between said first and said third valve passages; and
   side load reducing means for minimizing side loading on said floating pin and said movable valve member, said side load reducing means including a tappet reciprocally mounted in said valve housing adjacent one end of said floating pin, a biasing spring for causing said tappet to follow said floating pin and for causing said floating pin to follow said movable valve member to keep said second valve seat closed as said movable valve member is advanced toward said first position from said second position, a planar surface formed on one of said floating pin and said tappet, and a semi-spherical surface formed on the other of said floating pin and said tappet for abutment against said planar surface.

2. The valve assembly of claim 1, wherein said planar surface is formed on said tappet and said semi-spherical surface is formed on said floating pin.

3. The valve assembly of claim 2, wherein said biasing spring is positioned in a recess formed in said tappet.

4. The valve assembly of claim 2, wherein said valve housing includes a main portion containing said valve chamber and a tappet housing portion mounted at one end of said main portion, further including a pin stop plate positioned in compressive abutment between said main portion and said tappet housing portion, said pin stop plate positioned for abutment by said floating pin as said movable valve member moves toward said first position.

5. The valve assembly of claim 4, wherein said valve housing further includes a cover plate mounted on one side of said tappet housing portion opposite said pin stop plate for abutment by said tappet when said movable valve element is in said second position.

6. The valve assembly of claim 1, wherein said floating pin has a pin guided length and a pin diameter, a ratio of said pin guided length to said pin diameter being less than 4.5.

* * * * *